Sept. 23, 1958    KIYO TOMIYASU    2,853,678
MILLIMETER FREQUENCY METER
Filed Nov. 16, 1953
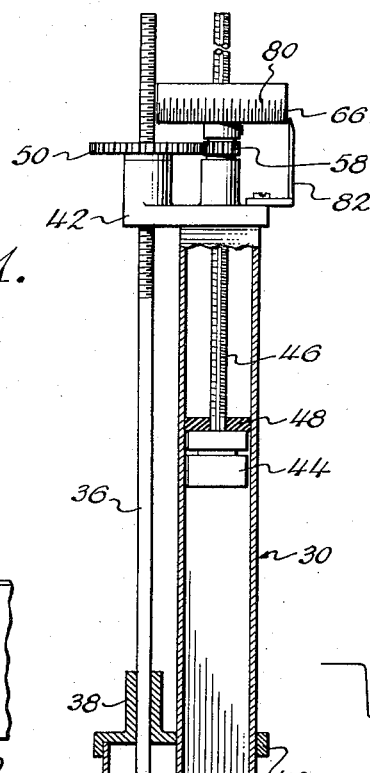
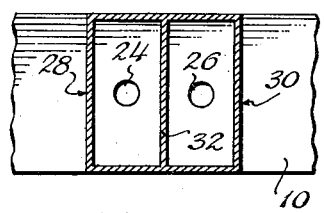
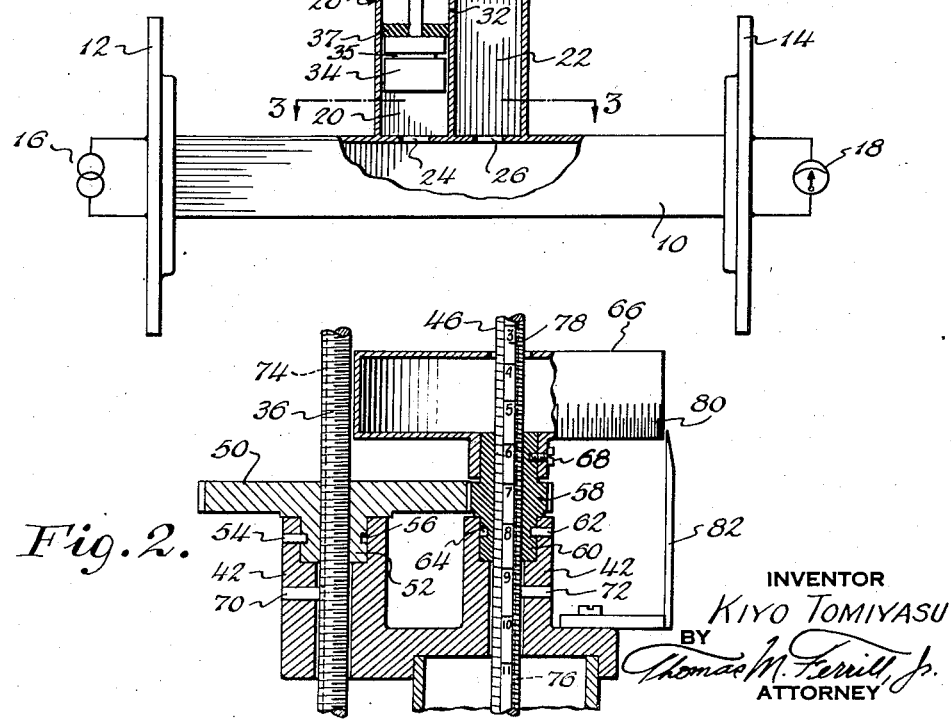
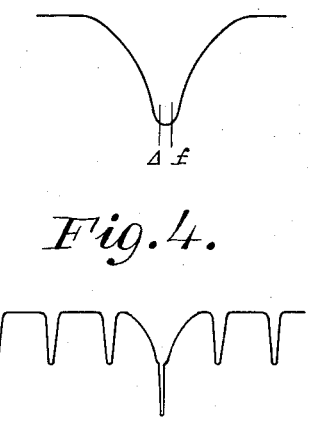
INVENTOR
KIYO TOMIYASU
BY
Thomas M. Ferrill, Jr.
ATTORNEY United States Patent Office 2,853,678
Patented Sept. 23, 1958

2,853,678
MILLIMETER FREQUENCY METER

Kiyo Tomiyasu, Flushing, N. Y., assignor to Sperry Rand Corporation, a corporation of Delaware Application November 16, 1953, Serial No. 392,130

7 Claims. (Cl. 324—81)

This invention relates to frequency meters, and more particularly, is concerned with frequency meters of the cavity wavemeter type for use in measuring frequencies in the millimeter wavelength band.

In the conventional cavity wavemeter, one end of a cavity is provided with an adjustable wall by means of which the size of the cavity and hence the resonant frequency of the cavity can be varied over a considerable range. By calibrating the wavemeter in terms of the adjustable end wall position versus frequency, the frequency of any input signal can be determined by positioning the adjustable end wall of the cavity at a point where the cavity is resonant for that particular input signal.

In order to resolve small differences in frequency of the measured signal and in order to achieve accuracy and reproducibility of absolute frequency measurements, it is necessary that the Q of the cavity be as high as possible so that the point of resonance in terms of positioning of the adjustable wall of the cavity is well defined. The sharper the resonant peak, the more accurately the cavity wavemeter can be tuned. Moreover, the driving mechanism for positioning the movable wall of the cavity must be very carefully designed to eliminate backlash and provide a greatly expanded measurement scale for determining the exact position of the movable wall.

When measuring frequencies in the millimeter region where the wavelength becomes quite small and hence the physical dimensions of the cavity become quite small, it becomes much more difficult to provide a cavity wavemeter having a high Q, since any mechanical imperfections which affect the Q of the cavity, such as surface imperfections, become greatly magnified in terms of wavelength. By the same token mechanical imperfections in the drive mechanism become more critical since the movement of the adjustable wall of the cavity is greatly reduced for a given frequency change.

It is the general object of this invention therefore to provide an improved frequency meter for operation in the millimeter frequency range.

It is another object of this invention to provide a cavity wavemeter for use in the millimeter frequency band which utilizes a relatively low Q cavity and at the same time permits a relatively large movement of the tuning mechanism for a given change in frequency, thus permitting a greatly expanded calibration scale.

These and other objects of the invention which will become apparent as the description proceeds are achieved by the provision of a frequency meter having two absorption-type cavities coupled to a transmission system. The tuning plungers forming the adjustable end walls of the two cavities are driven simultaneously from a common calibrated adjusting dial, the drive mechanism imparting a relative linear movement to the two tuning plungers in the ratio of, for example, 10:1. Thus one cavity is ten times longer than the other cavity, with the smaller cavity being tuned to the first resonant mode and the longer cavity being tuned to the tenth resonant mode of the signal being measured. The longer cavity acts as a vernier arrangement for accurately tuning the shorter cavity to the exact center of the resonant peak.

For a better understanding of the invention reference should be had to the accompanying drawing, wherein:

Fig. 1 is an elevational view, partly in section, of an embodiment of the present invention;

Fig. 2 is a fragmentary sectional view of the mechanical tuning mechanism with calibration for the wavemeter of Fig. 1;

Fig. 3 is a cross-sectional view taken on the line 3—3 of Fig. 1;

Fig. 4 is a graphical plot of voltage output versus cavity length at a given frequency; and Fig. 5 is a graphical plot of a resonance curve showing the region of indeterminancy $\Delta f$.

Referring to Fig. 1, the numeral 10 indicates generally a section of hollow rectangular wave guide provided at its ends with coupling flanges 12 and 14. The source of microwave energy, indicated at 16, is shown schematically as coupled to one end of the wave guide section 10 while a voltmeter, indicated generally at 18, is shown schematically as coupled to the other end of the wave guide section 10.

Two adjustable cavities 20 and 22 are coupled to the microwave energy transmitted in the wave guide 10 by apertures 24 and 26 respectively which are positioned in a broad wall of the wave guide 10, although the wavemeter cavities may be so coupled through a narrow wall as well. The cavities 20 and 22 are formed by a pair of rectangular wave guide sections, indicated generally at 28 and 30, the sections preferably having a common wall 32. In accordance with the principles of the present invention, the wave guide 30 is made considerably longer than the wave guide 28.

The adjustable end wall of the tunable cavity 20 is provided by a plunger 34. The plunger is separated from the walls of the wave guide to form a wave-trap type of short circuit, such as described in Patent No. 2,503,256, issued to E. L. Ginzton, having a slot 35 around the periphery which is a quarter wavelength in depth. The plunger 34 is supported on the end of an adjusting rod 36, the rod 36 extending through a guide 38 which is preferably an integral part of and is supported by a bracket member 40 that extends around the wave guide 30 and fits over the end of the wave guide 28. A guide plate 37 of dielectric material is secured to the backside of the plunger 34, the guide plate 37 slidably engaging the walls of the wave guide 28 and thereby centering the plunger 34 and the rod 36 within the wave guide 28. The upper end of the rod 36 is similarly supported by a guide and bracket member 42, which is supported at the upper end of the wave guide 30. The bracket members 40 and 42 are preferably secured in position by brazing or soldering to the wave guides 28 and 30.

Forming the adjustable end wall of the cavity 22 is a similar shorting plunger 44 which is adjustably supported by a rod 46 that extends through and is guided by the bracket member 42. A guide plate 48 of dielectric material is secured to the backside of the plunger 44 for properly positioning the plunger 44 relative to the walls of the wave guide 30.

In accordance with the theory of operation of the present invention, as hereinafter discussed, it is essential that tuning of the two cavities 20 and 22 take place simultaneously, that they be of different lengths, preferably of the order of 10:1, and that this ratio of lengths be maintained over the tuning range of the wavemeter. To this end, each of the rods 36 and 46 is threaded through a portion of its length. The threaded end of the rod 36 engages a threaded opening in a gear 50 which has a sleeve portion 52 journaled in the bracket member 42.

A pin 54 engages an annular groove 56 in the sleeve 52 which permits rotation of the gear 50 but prevents axial movement thereof.

Similarly a second pinion gear 58, which meshes with the gear 50, threadedly engages the upper end of the rod 46, the gear 58 having a sleeve portion 60 journaled in the bracket member 42. A pin 62 engages an annular groove 64 in the sleeve 60 of the gear 58 to prevent axial movement of the gear 58 while permitting rotational movement thereof. A manual control knob 66 is mounted on the pinion gear 58 and is locked in position, as by means of a set screw 68, whereby turning of the control knob 66 imparts rotation to the gears 50 and 58, rotation of these gears in turn imparting axial movement to the rods 36 and 46 by virute of the threaded engagement between the gears and the respective rods. Rotation of the rods 36 and 46 is prevented by means of keys in the form of pins 70 and 72 which engage longitudinally extending slots 74 and 76 in the rods 36 and 46 respectively.

By virtue of the gear ratio between the gears 50 and 58, which may be of the order of 4:1 or 5:1, and the relative pitch of the threads on the rods 36 and 46, which may be accordingly of the ratio of 2½:1 or 2:1, a 10:1 relative movement between the plunger 44 and plunger 34 is effected by the tuning mechanism as above described. Calibration of the tuning mechanism, for giving an accurate measure of the position of the plungers 34 and 44, is preferably provided by means of a linear scale inscribed on a flat surface 78 milled along the length of the rod 46, as shown in Fig. 2. Subdivision of the units inscribed in the linear scale along the rod is provided by the scale 80 extending around the periphery of the control knob 66. A pointer 82 mounted on the bracket member 42 is provided for reading off the proper setting on the calibrated control knob.

In an absorption type cavity wavemeter in which the cavity is coupled to the wall of the transmitting wave guide, as in the present wavemeter, as the cavity is tuned to resonance at the particular frequency of the source 16, a high impedance is introduced in series in the line so that the voltmeter 18 shows a sharp drop. As shown in Fig. 4, the voltmeter 18, as the plunger 44 is tuned over a substantial distance, shows a number of dips which correspond to resonant modes, that is, points at which the cavity is an integral multiple of a wavelength long.

By tuning to a higher mode, it is possible to improve accuracy and reproducibility of the frequency or wavelength of the signal from the source 16. That this is so may be demonstrated by reference to Fig. 5, in which is shown a plot of the resonant curve for a tunable cavity. It will be seen that there exists a region of indeterminancy, indicated at $\Delta f$, in which the slope of the resonance curve is substantially zero. The frequency can shift or the position of the plunger can be tuned over a range corresponding to $\Delta f$ without any noticeable change in the reading of the voltmeter 18. The higher the Q of the cavity the sharper is the resonant curve and the smaller is the region of indeterminancy. Since the cavity cannot be tuned any more accurately than within an error of $\Delta f$, it will be seen that the accuracy of the wavemeter is limited by the sharpness of the resonance curve and hence the Q of the cavity.

However, for a cavity of a given Q, by tuning to a higher resonant mode, for instance, the tenth mode, the error $\Delta f$ is substantially reduced by a corresponding factor, namely, a factor of 10. This is so because the resonance curve is substantially the same for the tenth resonant mode as it is for the fundamental. In other words, the frequency measurement taken by the cavity 22 when it is tuned to the tenth resonant mode is divided by a factor of 10 in determining the frequency or wavelength of the fundamental, and at the same time the indeterminancy $\Delta f$ is also divided by 10.

The difficulty of determining which one of the number of resonant modes the cavity 22 may be tuned to is overcome by the incorporation of the second cavity 20. By virtue of the 10:1 gear ratio between the movement of the plungers 44 and 34, when the cavity 20 is tuned to the fundamental, the cavity 22 is substantially tuned to the tenth mode. As shown in Fig. 4, the resonant point for the fundamental in the cavity 20 is readily identified by a drop in the indicated voltage on the meter 18, with the exact point of resonance being sharply indicated by the fact that the second cavity 22 resonates at the tenth resonant mode, causing an additional dip in the voltmeter.

From the above description it will be readily appreciated that the various objects of the invention have been achieved by the tandem tuned cavities in the wavemeter of the present invention. By tuning one cavity to the tenth resonant mode, a more accurate frequency measurement can be made for a given indeterminancy in tuning, permitting a lower Q cavity to be used than could otherwise be employed. A second cavity, mechanically tuned with the first and arranged to resonate at the fundamental resonant mode, provides a ready means for identifying the desired higher order mode to which the first cavity is tuned.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A frequency meter comprising a first section of rectangular wave guide, a second section of wave guide perpeudicular to said first section and abutting at one end a wall of said first section, a third section of wave guide perpedicular to said first section and abutting at one end a wall of said first section, an adjustable short-circuiting plunger positioned in each of said second and third wave guide sections, the wall portions of the first wave guide section and the plungers forming fixed and adjustable end walls respectively, defining with the second and third wave guide sections a pair of tunable cavities, each of the fixed end walls of said cavities having an aperture therein for coupling energy between the first wave guide section and the cavities, and means for simultaneously adjusting the positions of said plungers to tune the cavities, said means including linkage means for imparting a proportionately greater movement to one plunger than to the other plunger, said linkage means continuously maintaining the adjustable length of one cavity ten times the adjustable length of the other cavity whereby the one cavity is tuned to the tenth resonant mode with the other cavity tuned to the fundamental resonant mode at a given frequency.

2. A frequency meter comprising a first tunable cavity including a section of wave guide and having a fixed end wall and an opposite adjustable end wall, a second tunable cavity including a section of wave guide and having a fixed end wall and an adjustable end wall, said first and second cavities being adapted to serially receive the signal to be measured whereby the same signal current flows in each of said cavities, and means for adjustably positioning said adjustable end walls for tuning said cavities, said last-named means including linkage means for maintaining the distance between the adjustable and fixed end walls of the first tunable cavity an integral number of times greater than the distance between the adjustable and fixed end walls of the second cavity.

3. A frequency meter comprising first and second cavities, adjustable shorting plungers positioned within the cavities for varying the length and resonant frequency of said cavities, and means mechanically linking the plungers, said linkage means including means for imparting proportionately greater movement to one of said plungers than the other plunger, whereby said cavities may be tuned simultaneously to different resonant modes of any signal for a frequency within the tuning range of the cavities, said first and second cavities being adapted to serially receive the signal to be measured whereby the same signal current flows in each of said cavities.

4. A frequency meter comprising a first tunable cavity including a section of wave guide and having a fixed end wall and an opposite adjustable end wall, a second tunable cavity including a section of wave guide and having a fixed end wall and an adjustable end wall, means for coupling energy to said cavities, means for indicating the sum of the impedances of said cavities, and means for adjustably positioning said adjustable end walls for tuning said cavities, said last-named means including linkage means for imparting proportionally greater movement of the adjustable end wall of one of the cavities than the other cavity, the distance between the adjustable and fixed end walls of the first tunable cavity being maintained an integral number of times the distance between the adjustable and fixed end walls of the second cavity.

5. A frequency meter comprising first and second resonant cavities of substantially different size, a wave guide adapted to receive an input signal, means for connecting said first and second cavities in series with said wave guide, means for tuning the first cavity to the fundamental resonance mode at the frequency of the input signal, means for tuning the second cavity to a higher order resonance mode at the frequency of the input signal, and mechanical linkage means operatively connecting the tuning means of the first cavity to the tuning means of the second cavity, said linkage means actuating said tuning means to maintain the cavities resonant to the respective predetermined resonance modes with change in frequency of the input signal, whereby tuning of one cavity to resonance at a predetermined resonance mode automatically tunes the other cavity to another predetermined resonance mode.

6. A tunable resonator system comprising a first section of wave guide, a second section of wave guide perpendicular to said first section and abutting at one end the wall of said first section, a third section of wave guide perpendicular to said first section and abutting at one end a wall of said first section, an adjustable short-circuiting plunger positioned in each of said second and third wave guide sections, the wall portions of the first wave guide section and the plungers forming fixed and adjustable end walls respectively, defining with the second and third wave guide sections a pair of tunable cavities, means in each of the fixed end walls of said cavities for coupling energy between the first wave guide section and the cavities, and means for simultaneously adjusting the position of said plungers to tune the cavities, said means including linkage means for imparting a proportionately greater movement to one plunger than to the other plunger.

7. A frequency meter comprising a first tunable cavity including a section of wave guide and having a fixed end wall and an opposite adjustable end wall, a second tunable cavity including a section of wave guide and having a fixed end wall and an adjustable end wall, means for coupling the signal to be measured into each of said cavities, said means for coupling including a section of rectangular wave guide, each of the fixed end walls of the cavities being contiguous with one of the walls of the section of the rectangular wave guide, and each of the fixed end walls and contiguous portion of the rectangular wave guide wall having a coupling aperture therein for coupling energy between the rectangular wave guide section and the cavities, and means for adjustably positioning said adjustable end walls for tuning said cavities, said last-named means including linkage means for maintaining the distance between the adjustable and fixed end walls of the first tunable cavity an interal number of times greater than the distance between the adjustable and fixed end walls of the second cavity.

References Cited in the file of this patent

UNITED STATES PATENTS

| | | |
|---|---|---|
| 2,132,208 | Dunmore | Oct. 4, 1938 |
| 2,503,256 | Ginzton et al. | Apr. 11, 1950 |
| 2,508,573 | Hulstede | May 23, 1950 |
| 2,510,064 | Bryan | June 6, 1950 |
| 2,727,950 | Wise | Dec. 20, 1955 |